United States Patent
Ma et al.

(10) Patent No.: US 8,423,855 B2
(45) Date of Patent: Apr. 16, 2013

(54) ADAPTIVE AND SCALABLE PACKER ERROR CORRECTION APPARATUS AND METHOD

(75) Inventors: Xiao Jun Ma, Beijing (CN); Huan Qiang Zhang, Beijing (CN); Ren Lei Chen, Beijing (CN); Guang Hua Zhou, Beijing (CN); Jun Li, Cranbury, NJ (US); Charles Chuanming Wang, Beijing (CN)

(73) Assignee: Thomson Licensing (FR)

( * ) Notice: Subject to any disclaimer, the term of this patent is extended or adjusted under 35 U.S.C. 154(b) by 466 days.

(21) Appl. No.: 12/449,913

(22) PCT Filed: Mar. 6, 2007

(86) PCT No.: PCT/CN2007/000710
§ 371 (c)(1),
(2), (4) Date: Sep. 2, 2009

(87) PCT Pub. No.: WO2008/106823
PCT Pub. Date: Sep. 12, 2008

(65) Prior Publication Data
US 2010/0095181 A1     Apr. 15, 2010

(51) Int. Cl.
*G06F 11/00*     (2006.01)
(52) U.S. Cl.
USPC .......................................................... 714/748
(58) Field of Classification Search ................... 714/748
See application file for complete search history.

(56) References Cited

U.S. PATENT DOCUMENTS

| 5,432,798 | A | * | 7/1995 | Blair | 714/748 |
| 2002/0133615 | A1 | | 9/2002 | Satran et al. | |
| 2002/0196812 | A1 | * | 12/2002 | Yamaguchi et al. | 370/474 |
| 2006/0165044 | A1 | * | 7/2006 | Sanderford et al. | 370/347 |

FOREIGN PATENT DOCUMENTS

| CN | 1859070 A | 11/2006 |
| EP | 1686716 | 8/2006 |
| JP | 2000115051 | 4/2000 |
| WO | WO 2006/076787 | 7/2006 |

OTHER PUBLICATIONS

Search Report Dated December 4, 2007.
Aoki, S. et al., "A Study on Reliable Multicast for IPTV Services", IEICE Technical Report, vol. 106, No. 239, Sep. 7, 2006, pp. 1-8. English Abstract.
Hashimoto, T. et al., "Performance Evaluation of Reliable Multicast Communication Protocols under Heterogeneous Transmission Delay Circumstances", IEICE Trans. Commun., vol. E82-B, No. 10, Oct. 1, 1999, pp. 1609-1617.

* cited by examiner

*Primary Examiner* — Scott Baderman
*Assistant Examiner* — Jigar Patel
(74) *Attorney, Agent, or Firm* — Jack Schwartz & Associates, PLLC

(57) ABSTRACT

An adaptive and scalable packet error correction apparatus and method in a wireless multicast network is provided. Each retransmission request from a receiver contains a round number and the number of repairs sent in that round. At each receiver, there are two counters for counting the rounds sent out on the network and the number of repairs that have been required. A receiver on the wireless multicast network listens to the ARQ requests sent by other receivers to update the two counters and determines whether its request should be suppressed or be sent out.

10 Claims, 4 Drawing Sheets

ADAPTIVE AND SCALABLE PACKER ERROR CORRECTION APPARATUS AND METHOD

This application claims the benefit, under 35 U.S.C. §365 of International Application PCT/CN2007/000710, filed Mar. 6, 2007, which was published in accordance with PCT Article 21(2) on Sep. 12, 2008 in English.

FIELD OF THE INVENTION

This invention relates to data transmission, and particularly relates to an adaptive and scalable packet error correction apparatus and method.

BACKGROUND OF THE INVENTION

Using wireless network to perform data communication, especially to perform video and/or audio streaming is a prevailing application nowadays. Some wireless systems, for example WLAN, can distribute video streams from a sender to multiple receivers in a multicast area.

FIG. 1 is a diagram showing a conventional multicast wireless system. The system is used to transmit video streams from at least one sender 10 to multiple receivers 20. Video packets are generated by a video server (not shown in FIG. 1) at the sender and are transmitted to the receivers. When the receivers receive the video packets, they decode these video packets. If packet loss occurs in received video packets at a receiver, the decoder at the receiver will not be able to decode the video packets. Thus some error correction methods are needed. Forward Error Correction (FEC) and Automatic Repeat Request (ARQ) are two basic error correction methods.

Forward Error Correction (FEC) is a method with some redundant packets being sent to a receiver besides the source data packets, so that the packet loss can be recovered by the redundant packets at the receiver. In a kind of FEC methods, some proactive repairs (redundant packets) are included in a stream of data packets. The proactive repairs are sent before it is known whether the transmission of the repairs is necessary. In FEC, the packet sender introduces N-K repairs for every K source packets to make N packets. When the receiver receives at least K out of the N packets, it can recover all the K source packets. In FEC method, the number of lost source packets has to be compensated by the receipt of at least the same number of repairs in order to recover all of the source packets.

If the repairs are insufficient to reliably decode the source data at a receiver, the receiver will make a request for retransmission of additional repairs. This request is called Automatic Repeat Request (ARQ). The ARQs are continuously made until the data packets are decoded successfully.

A combination of FEC and ARQ, named hybrid FEC/ARQ method, has been extensively studied in the past decades. An example is shown in "A Study of Proactive Hybrid FEC/ARQ and Scalable Feedback Techniques for Reliable, Real-Time Multicast, which appears in Computer Communication, March 2001, written by Dan Rubenstein et al. The paper discloses a hybrid FEC/ARQ method used in multicast network, in which the sender chooses a proactivity factor to adjust the proactive repairs according to network conditions. If the sender is being heavily inundated with feedback, then it should increase the proactivity factor to add more proactive repairs. If the sender is receiving little feedback, then it should reduce the proactivity factor to reduce the number of the proactive repairs.

Each ARQ/NAK ((i.e. Negative Acknowledgement, notifying the sender of a packet loss), ARQ is an equivalent of NAK) from a receiver contains the number of repairs $n_r$ that the receiver requires for transmission, as well as a NAK round, $N_r$. The NAK round indicates the current "round" of the block transmission as perceived by the receiver. When the sender transmits repairs, a NAK round number, $N_s$, is contained in its packet, corresponding to the largest NAK round it has received from any receiver for that block.

Three ways can be used by the sender to respond to a NAK requesting $n_r$ repairs that has just arrived with round number $N_r$ from the receiver. One of the methods used by the sender to respond to a NAK from a client is called round-current. In this method, the sender maintains a count, n, of the total number of repairs transmitted whose round number equals the current sender round number, $N_s$. For the arriving NAK, if $N_r<N_s$, then the NAK is ignored. If $N_r=N_s$, max(0, $n_r$-n) packets are transmitted, and n is set to max(n, $n_r$). If $N_r>N_s$, n is set to $n_r$, $N_s=N_r$, and $n_r$ packets are transmitted.

A receiver's NAK round number, $N_r$, is initially 1. After sending a NAK, it increments its NAK counter by 1, $N_r=N_r+1$, for example. Upon receiving a packet from the sender with a NAK round number larger than or equal to its own current value, the receiver updates its NAK round number to the sender's current value plus one (if $N_s \geq N_r$, let $N_r=N_s+1$).

However, as shown in the paper, some redundant requests are sent unnecessarily in the above method. For example, when there are two receivers, A and B, in which receiver A has a smaller round trip time than that of receiver B. When both receivers send NAKs with round number 1, with B requesting $n_b$ repairs and A requesting a smaller number of repairs $n_a$. Assume that the sender gets the request for $n_a$ repairs first, and multicasts out $n_a$ repairs. If some of these repairs are lost on the path to receiver A, then A will request an additional repairs with round number 2, prior to the arrival (or its knowledge) of the $n_b$-$n_a$ additional repairs being transmitted with round number 1. Hence, the repairs requested in round 2 are redundant when $n_b$-$n_a$ repairs can recover the remaining lost packets, but because the round number in the NAK is larger, all packets are transmitted.

In addition, in this method, all receivers are coordinated by the NAK round number $N_s$ and the repairs information from the sender. If a receiver sends its request with a round number and the number of repairs needed, other receivers won't know this information until the procedure from the receiver to the sender and then from the sender to them finishes. Since this procedure takes quite a lot of time, some senders may not get the information sent by other receivers timely and may send some redundant requests.

SUMMARY OF THE INVENTION

In one aspect, a packet error correction method at a receiver on a multicast network is provided. The method includes steps of listening to other receivers to detect retransmission requests sent by other receivers; determining whether the retransmission request at the receiver should be suppressed or be sent out as a function of the cumulation of a parameter of the detected retransmission requests; and sending out the retransmission request if the retransmission request is not suppressed.

According to an embodiment, each retransmission request from the receiver contains information showing the number of current round of retransmission request sent out on the network and showing how many repairs the receiver requests in the current round of retransmission request.

According to another embodiment, the cumulation of a parameter of the detected retransmission requests is cumulating the number of repairs that have been requested by the detected retransmission requests.

In still another embodiment, the receiver further keeps the largest round number of the detected retransmission requests.

Advantageously, the receiver adds the number of repairs contained in the information of a detected retransmission request to the accumulation and updates the kept round number at the receiver when the detected retransmission request contains a larger round number than the round number kept at the receiver.

In a preferable embodiment, the receiver sends out its retransmission request when the number of repairs the receiver needs is larger than the number of repairs cumulated.

In a further embodiment, when the receiver sends out the retransmission request, the round number kept at the receiver is increased by 1 and the increased round number is contained in the retransmission request.

In another embodiment, when the receiver sends out the retransmission request, the number of repairs requested is the difference between the number of the accumulated repairs and the number of repairs the receiver needs, and the difference is added to the accumulation.

According to still another embodiment, when the receiver detects packet loss, it will wait a delay period before sending a retransmission request out, and the delay period is preferably inversely ratio to the number of repairs that the receiver needs.

In another aspect, there describes a receiver, for receiving the data packets from a sender on the multicast network. The receiver includes a retransmission request detector, detecting the retransmission requests sent by other receivers; a retransmission request processor, determining whether an retransmission request should be suppressed or be sent out as a function of the cumulation of a parameter of the detected retransmission requests; and a retransmission request transmitter, sending out the retransmission request if the retransmission request is not suppressed.

According to an embodiment, each retransmission request from the receiver contains information showing the number of current round of retransmission request sent out on the network and showing how many repairs the receiver requests in the current round of retransmission request.

According to another embodiment, the cumulation of a parameter of the detected retransmission requests is cumulating the number of repairs that have been requested by the detected retransmission requests.

According to a further embodiment, the receiver further includes a repairs counting unit, cumulating the number of repairs that have been requested by the detected retransmission requests.

In another embodiment, the receiver further includes a round counting unit, keeping the largest round number of the detected retransmission requests.

In an embodiment, the round counting unit updates the counting of the number of rounds when the round count kept in the round counting unit is smaller than the round number contained in the detected request.

In another embodiment, the receiver sends out its retransmission request when the number of repairs the receiver needs is larger than the number of repairs cumulated.

In still another embodiment, when the receiver sends out the retransmission request, the round number kept in the round counting unit is increased by 1 and the increased round number is contained in the retransmission request.

Advantageously, when the receiver sends out the retransmission request, the number of repairs requested is the difference between the number of the accumulated repairs and the number of repairs the receiver needs, and this difference is added to the accumulation.

In a preferable embodiment, the receiver further includes a delay period timer, timing a delay period which will be waited before the receiver sends out a retransmission request.

In a further embodiment, the delay period is inversely ratio to the number of repairs that the receiver needs.

BRIEF DESCRIPTION OF THE DRAWINGS

Other characteristics and advantages of the invention will be apparent through the description of a non-limiting embodiment of the invention, which will be illustrated with the help of the accompanying drawings.

DETAILED DESCRIPTION OF THE INVENTION

The exemplifications set out herein illustrated preferred embodiments of the invention, and such exemplifications should not be construed as limiting the scope of the invention in any manner.

Herein are some illustrating embodiments to explain the methods, processes and devices dealing with video streaming at packet sender and packet receiver respectively.

As known by those skilled in the art, in some real-time video applications, such as on-line movies, for a block of video packets transmitted to a receiver, these video packets are buffered at the receiver for a period of time BT before they are sent to the decoder. During the buffering period BT, if there is no packet loss at the receiver, the video packets can be successfully decoded by the decoder after the buffering period BT ends. Whenever the receiver detects a number of packets lost during the buffering period BT, it will send ARQs to the sender for additional repairs retransmission until the video packets are recovered or until the buffering period expires.

Figure 1:
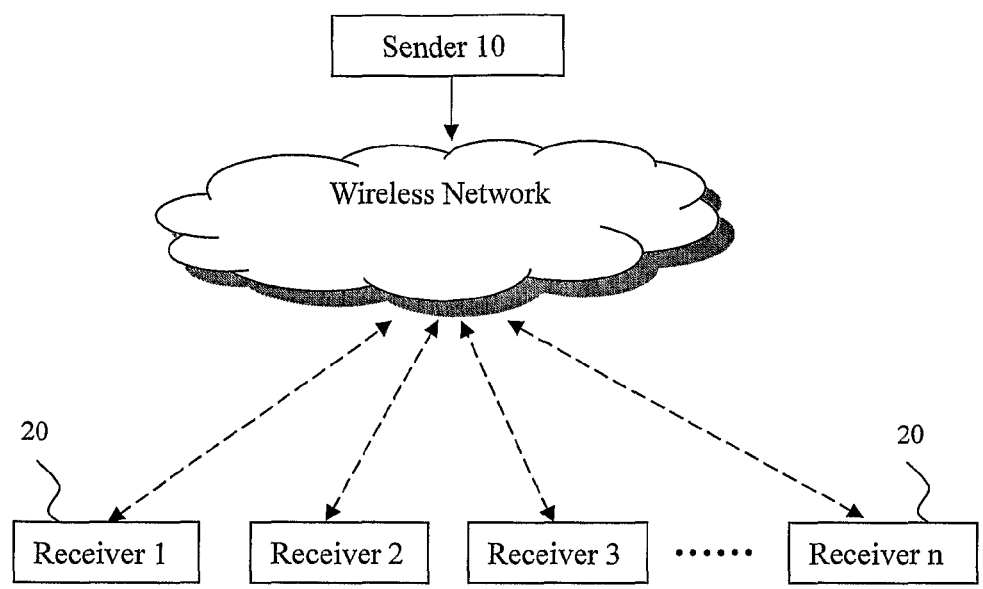
FIG. 1 is a diagram showing a conventional multicast wireless system.
Figure 2:
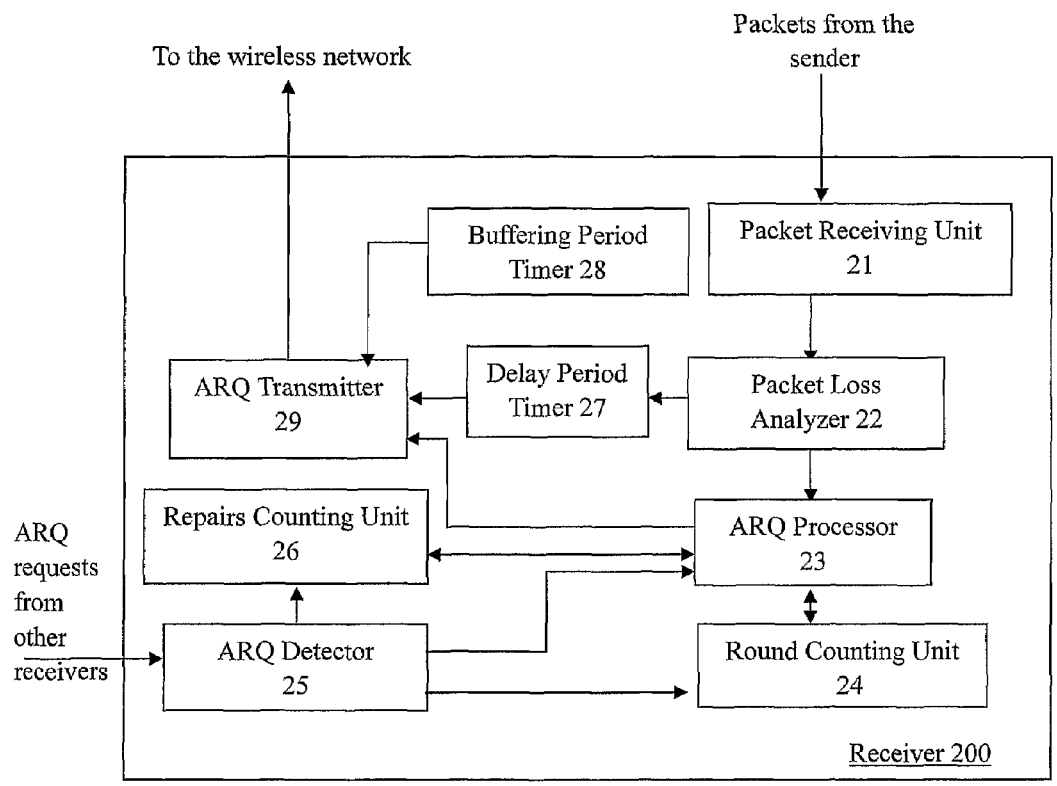
FIG. 2 is a block diagram showing the components of the receiver according to an embodiment.

FIG. 2 shows a receiver according to the present embodiment. As shown in FIG. 2, each receiver 200 includes a packet receiving unit 21, receiving video packets together with some proactive repairs to recover the packet loss, and receiving retransmitted repairs from the sender when the packet loss can't be recovered by the proactive repairs, additional repairs being requested by and retransmitted to the receiver 200; a packet loss analyzer 22, analyzing how many packets are lost according to the received packets; an ARQ detector 25, detecting the ARQs sent by other receivers; a round counting unit 24, counting the number of rounds that have been launched; a repairs counting unit 26, counting the number of repairs sent in all rounds launched; an ARQ processor 23, determining whether an ARQ should be sent out or be suppressed based on the detected ARQs sent by other receivers and the packet loss at the receiver 200; an ARQ transmitter 29, broadcasting the ARQ over the network; a buffering period timer 28, timing the buffering period BT; a delay period timer 27, timing the delay period waited before an ARQ is sent out.

Figure 3:
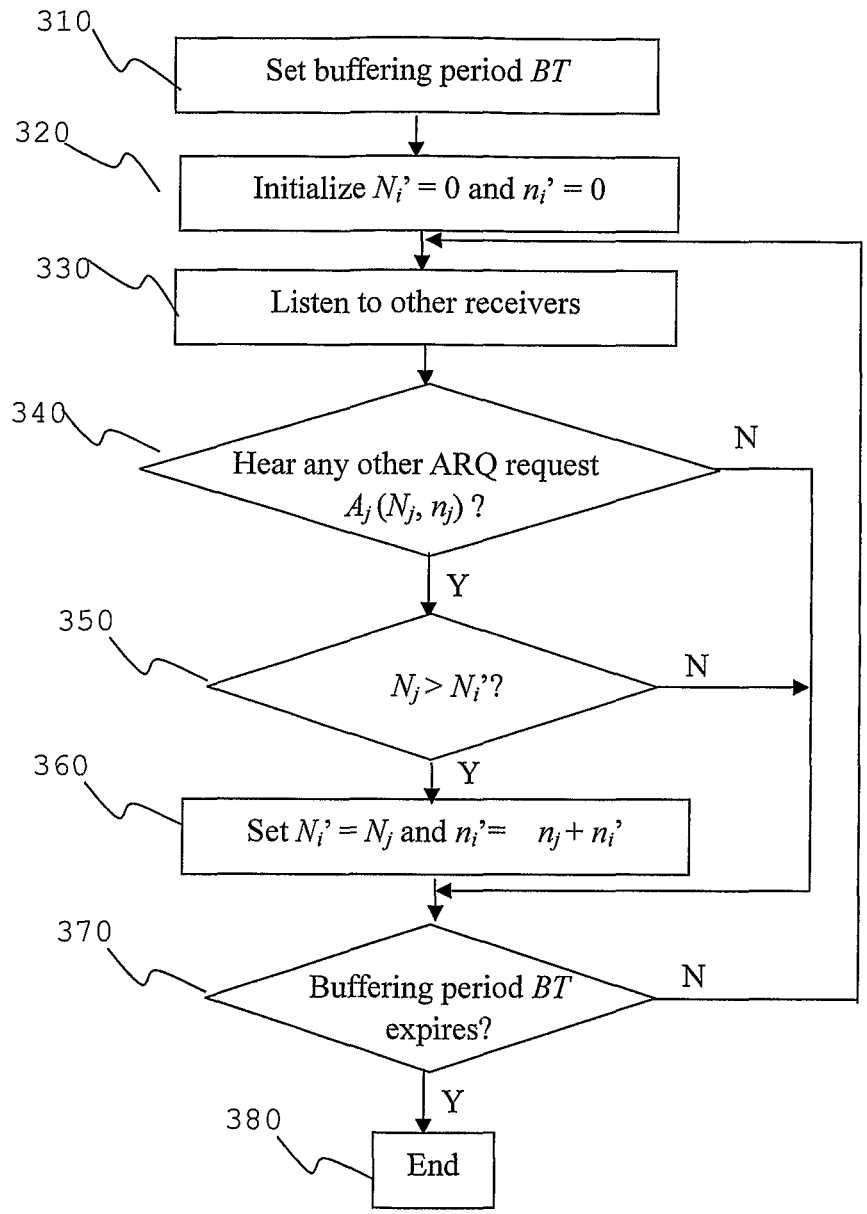
FIG. 3 is a flowchart showing the round number updating procedure at the packet receivers.

Now consider FIG. 3. FIG. 3 is a flowchart showing the round number updating procedure at the packet receivers.

Each ARQ $A_i$ from a receiver $C_i$ contains the number of repairs that the receiver $C_i$ requires for transmission, $n_i$, as well as an ARQ round number, $N_i$, which indicates the current round of the block transmission.

For a block of video packets transmitted to the receiver $C_i$, the buffing period timer 28 first sets the buffering period BT. The method of setting the period BT is well known in the prior art, which will not be described herein. There is an ARQ round counter $N_i'$ and a repairs counter $n_i'$ at the receiver $C_i$. The ARQ round counter $N_i'$ is used to count how many rounds of ARQs have been sent out, and the repairs counter $n_i'$ is used to count the number of repairs sent in all rounds launched. The round counter is initially set to 0 at the round counting unit 24, and the repairs counter $n_i'$ is also initialized to 0 at the repairs counting unit 26. During the BT period, the receiver $C_i$ keeps listening to the ARQs from other receivers to update the round counter $N_i'$ and the repairs counter $n_i'$. For clarity of the illustration, the round counter and the repairs counter updating processes and the packet loss handling process are described separately below.

The round counter and the repairs counter updating processes are introduced first. Combine FIG. 2 with FIG. 3. The buffing period timer 28 sets the buffering period BT in step 310. In step 320, the ARQ round counter $N_i'$ is initially set 0 at the round counting unit 24, and the repairs counter $n_i'$ is also initialized to 0 at the repairs counting unit 26.

In step 330, the ARQ detector 25 at the receiver C, listens to other receivers on the wireless network during the buffering period BT. Then it is determined in step 340 whether the receiver $C_i$ has heard any other ARQ $A_j(N_j, n_j)$ from other receivers. If no (N), the process goes to step 370 to detect whether the BT expires. If it is "Y" in step 340, it is further determined whether $N_j$ is larger than $N_i'$ in step 350. This step is used to determine whether another round of request has been sent out after the round $N_i'$, and whether the round counter $N_i'$ and the repairs counter $n_i'$ at the receiver $C_i$ need to be updated at the round counting unit 24 and the repairs counting unit 26 respectively. If $N_j$ is larger than $N_i'$, i.e. "Y" in step 350, the round counting unit 24 at the receiver $C_i$ will update the round counter $N_i'$ according to $N_j$, and the repairs counting unit 28 sets $n_i'=n_j+n_i'$ in step 360. That is, another round of ARQ has been sent out, and the total number of the rounds of ARQs launched by all receivers are $N_j$ and the number of the repairs requested by all receivers is $n_i'=n_j=n_i'$ now. If no, the request $A_j$ is ignored, and the process goes to step 370. Because when $N_i'$ is larger than or equal to $N_j$, it means that the receiver $C_j$ may have missed some receivers sending their requests before it sends the request $A_j$. So sometimes the packet loss at the receiver $C_j$ may be recovered by the repairs sent by the receivers unheard by receiver $C_j$. To avoid such a case occurring, this kind of requests is ignored at the receiver. And though the request $A_j$ has been sent out by receiver $C_j$, the request may also be ignored at the sender (when $N_j$ is smaller than $N_i'$). In step 370 the receiver $C_i$ will detect whether the buffering period BT expires. If the buffering period expires, i.e. "Y" in step 370, it means that the block of video packets needs to be sent to the decoder. So the procedure then ends at the step 380. Otherwise the process turns to step 330 to continue detecting the ARQs sent on the network.

In this way, with the updating process, each receiver can know the situation of ARQs sent by other receivers promptly, knowing how many rounds of ARQs have been performed and how many ARQs have been sent out.

While the receiver $C_i$ listens to other receivers to update the round counter $N_i'$ and the repairs counter $n_i'$, it also detects whether the packet loss happens to its block of video packets and deals with the packet loss accordingly.

Figure 4:
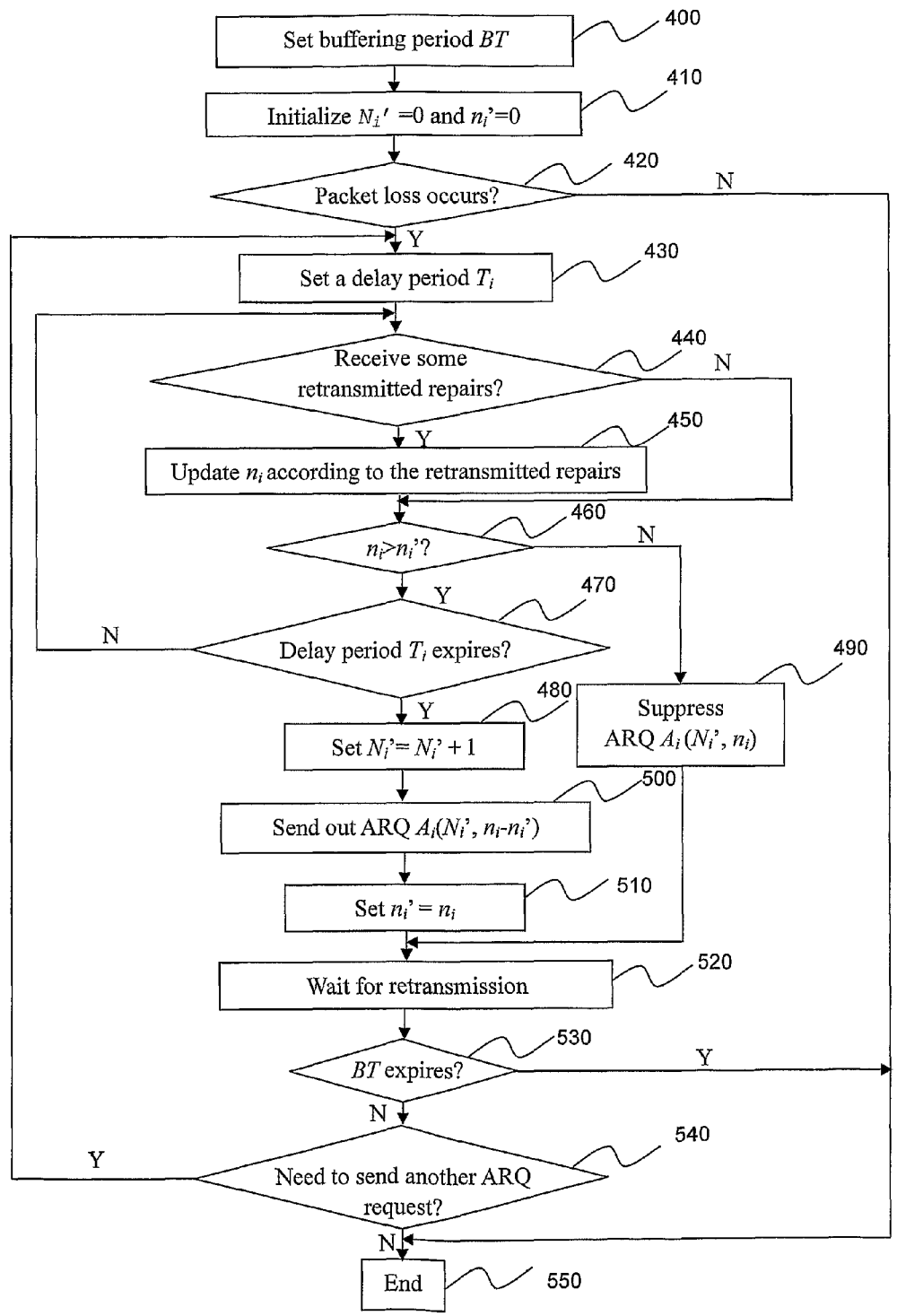
FIG. 4 is a flow chart showing the process when packet loss occurs during the buffering period.

FIG. 4 is a flow chart showing the process when packet loss occurs. As shown in FIG. 4, the buffering period BT is set in step 400, and the round counter $N_i'$ and the repairs counter $n_i'$ are initialized to 0 in step 410, which are the same with that shown in step 310 and 320 of FIG. 3. During the buffering period BT, it is determined whether some packets are lost in step 420. If there is no packet loss, i.e. "N" in step 420, the process goes to step 530. When the packet loss occurs at the receiver $C_i$, i.e. "Y" in step 420, the ARQ processor 23 at the receiver $C_i$ will determine the number of repairs needing to be retransmitted, $n_i$. Before sending out the ARQ, the receiver $C_i$ needs to wait a delay period $T_i$. This delay period $T_i$ is set by the delay period timer 27 in step 430. The delay period $T_i$ is smaller than the buffering period BT and adaptively set according to, preferably inversely ratio to, the number of repairs the receiver needs, $n_i$, so that the ARQ requiring larger number of repairs can be sent out earlier. Thus some redundant requests can be suppressed. Because even if the receivers with less lost video packets haven't sent out their requests to the sender, the retransmission with larger number of repairs requested by the receivers with more lost packets are enough to recover the lost packets at those receivers with less lost packets.

In step 440, it is determined whether the receiver $C_i$ has received some retransmitted repairs. If "Y", the receiver $C_i$ will determine how many lost packets have been recovered and update the number of repairs $n_i$. Then it is determined whether the request $A_i$ should be suppressed or not. This decision is made based on the comparison of the number of repairs $n_i$ that the receiver $C_i$ needs with the repairs counter $n_i'$ at the repairs counting unit 26 in step 460. If the number of repairs that the receiver $C_i$ needs, $n_i$, is not larger than the lately updated repairs counter $n_i'$ at the repairs counting unit 26, i.e. "N" in step 460, the ARQ processor 23 will suppress its own ARQ $A_i$ in step 490 and wait for repairs retransmission in step 520, because in such a case, the ARQs sent with the number of repairs requested are enough to recover the packet loss at the receiver $C_i$. So the request $A_i$ sent by receiver $C_i$ is not necessary. In step 470, it is determined whether the delay period $T_i$ expires. Because during the delay period $T_i$ the repairs counter $n_i'$ is also kept updated according to the ARQs from other receivers. Whenever the updated repairs counter $n_i'$ is larger than or equals to the receiver $C_i$ will suppress the ARQ A. The receiver $C_i$ will continue to compare $n_i$ with $n_i'$ until the delay period $T_i$ expires.

If the number of repairs, $n_i$, that the receiver $C_i$ needs is still larger than the parameter $n_i'$ when the delay period $T_i$ expires, i.e. "Y" in step 470, the receiver $C_i$ will need to perform a new round of ARQ. Upon the delay period $T_i$ expires, the round counter is increased by 1 at the round counting unit 24 in step 480 and the ARQ $A_i$ with the new round number $N_i'$ and the number of repairs needed to retransmit by the sender $n_i$-$n_i'$ is sent out in step 500. And then the repairs counter $n_i'$ is updated in step 510, i.e. set $n_i'=n_i$ at the repairs counting unit 26. Because if the ARQ $A_i$ is sent out, there will be $n_i$ repairs have been requested.

Then the receiver will wait for the retransmission for a period in step 520. It is determined in step 530 whether the buffering period BT expires. If it is "Y", the process ends in step 550. If it is "N", when the receiver receives the repairs before BT expires, it will determine whether the packet loss can be recovered by the retransmitted repairs and whether another ARQ needs to be sent out in step 540. If some of the retransmitted repairs are lost during the retransmission, the receiver will decide to perform another round of request and the process returns to step 430 to set a delay period $T_i$ according to the number of packets still needed as described before. If the retransmitted repairs are enough to recover the packet loss at the receiver $C_i$ and the receiver will not need another round of ARQ transmission, i.e. "N" in step 540, the process ends in step 550.

The process at the sender is performed in round-current way as proposed by Dan Rubenstein et al. The sender maintains a round $N_s$ which is 0 initially, and maintains a count, n, of the total number of repairs transmitted whose round number equals the current sender round number, $N_s$. For the arriving ARQ, if $N_i<N_s$, then ignore the ARQ. If $N_i=N_s$, transmit max (0, $n_i$-n) packets, and set n=max (n, $n_i$). If $N_i>N_s$, set n=$n_i$, $N_s=N_1$, and transmit $n_i$ packets.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A packet error correction method at a receiver on a multicast network, including steps of
   determining, by the receiver, a tentative number of repairs to be requested;
   receiving, by the receiver, retransmitted repairs in response to retransmission requests sent by other receivers; and
   sending out, by the receiver, a retransmission request if the number of the received retransmitted repairs is smaller than the tentative number of repairs to be requested,
   wherein it further comprise the steps of
   detecting the retransmission requests sent by others, wherein a retransmission request contains a first parameter associated with a retransmission number and a second parameter indicating the number of repairs to be requested; and
   updating retransmission number and number of the received retransmitted repairs stored in the receiver based on the detected retransmission requests, wherein the updating of the number of the received retransmitted repairs further includes the second parameter contained in a detected retransmission request is added to the current number of the received transmitted repairs if the value of the first parameter of the detected retransmission request is larger than the current number of retransmission requests in the receiver.

2. The method of claim 1, wherein the number of retransmission requests in the receiver is updated after the receiver sends the retransmission request, or after the receiver receives a repair containing a corresponding value larger than the number of retransmission requests.

3. The method of claim 1, wherein the value of the second parameter is the difference between the tentative number of repairs to be requested and the number of received transmitted repairs.

4. The method of claim 1, wherein when the receiver detects packet loss, it will wait a delay period before sending out the retransmission request.

5. The method of claim 4, wherein the delay period is inversely related to the tentative number of repairs.

6. A receiver, for receiving the data packets from a sender on the multicast network, including
   a retransmission request detector for detecting retransmission requests sent by other receivers, wherein a retransmission request contains a first parameter associated with a retransmission number and a second parameter indicating the number of repairs to be requested;
   a repairs counting unit for updating number of received retransmitted repairs stored in the receiver, wherein the updating of the number of the received transmitted repairs further comprises adding the second parameter contained in a detected retransmission request to the current number of the received transmitted repairs if the value of the first parameter of the detected retransmission request is larger than the current number of retransmission requests in the receiver;
   a round counting unit for updating number of retransmission requests stored in the receiver;
   a retransmission request processor, for determining whether a retransmission request is going to be sent out or not based on the number of received retransmitted repairs in response to retransmission requests sent by other receivers and a tentative number of repairs determined by the receiver; and
   a retransmission request transmitter, for sending out the retransmission request if the number of the received retransmitted repairs is smaller than the tentative number of repairs.

7. The receiver according to claim 6, wherein the round counting unit also updates the number of retransmission requests after the receiver sends the retransmission request or after the receiver receives a repair containing a corresponding value larger than a current number of retransmissions.

8. The receiver according to claim 6, wherein the value of the second parameter is the difference between the tentative number of repairs to be requested and the number of received transmitted repairs.

9. The receiver according to claim 6, wherein it further includes a delay period timer, timing a delay period which will be waited before the receiver sends out the retransmission request.

10. The receiver according to claim 9, wherein the delay period is inversely related to the tentative number of repairs.

* * * * *